US006851012B2

(12) United States Patent
Yamashima

(10) Patent No.: US 6,851,012 B2
(45) Date of Patent: Feb. 1, 2005

(54) INFORMATION PROCESSING SYSTEM, INFORMATION PROCESSING METHOD AND READABLE-BY-COMPUTER RECORDING MEDIUM

(75) Inventor: Masaki Yamashima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 315 days.

(21) Appl. No.: 10/096,822

(22) Filed: Mar. 14, 2002

(65) Prior Publication Data
US 2002/0103984 A1 Aug. 1, 2002

Related U.S. Application Data

(63) Continuation of application No. PCT/JP99/06390, filed on Nov. 16, 1999.

(30) Foreign Application Priority Data

Nov. 16, 1999 (JP) .................................. PCT/JP99/06390

(51) Int. Cl.$^7$ ............................................. G06F 12/00
(52) U.S. Cl. ....................... 711/101; 711/101; 711/103; 711/162
(58) Field of Search ................................ 711/101, 103, 711/162

(56) References Cited

FOREIGN PATENT DOCUMENTS

| JP | 06-131082 | 5/1994 | |
| JP | 08241142 A | 9/1996 | |
| JP | 8-241142 A | 9/1996 | ................. 711/103 |
| JP | 08-305469 | 11/1996 | |
| JP | 9-160839 | 6/1997 | |
| JP | 9-160839 A | 6/1997 | ................. 711/103 |
| JP | 10-39942 A | 2/1998 | ................. 711/103 |
| JP | 10039942 A | 2/1998 | |
| JP | 11-085332 | 3/1999 | |

OTHER PUBLICATIONS

International Search Report from PCT/JP99/06390 (of which the present application is a continuation under 35 U.S.C. 111(a)), mailed Feb. 8, 2000 (citing references AJ, AK, and AL only).

Primary Examiner—Mano Padmanabhan
Assistant Examiner—Mehdi Namazi
(74) Attorney, Agent, or Firm—Staas & Halsey LLP

(57) ABSTRACT

An information processing system includes a volatile storage unit stored with save target information to be saved when transiting to a sleep state in which a consumption of electric power can be temporarily restrained, a nonvolatile storage unit of saving the save target information when transiting the sleep state, a nonvolatile storage medium of storing the save target information remaining unstorable in the nonvolatile storage unit, and a control unit of storing the nonvolatile storage unit with the save target information and division-storing the nonvolatile storage medium with the save target information exceeding a storage capacity of the nonvolatile storage unit.

12 Claims, 7 Drawing Sheets

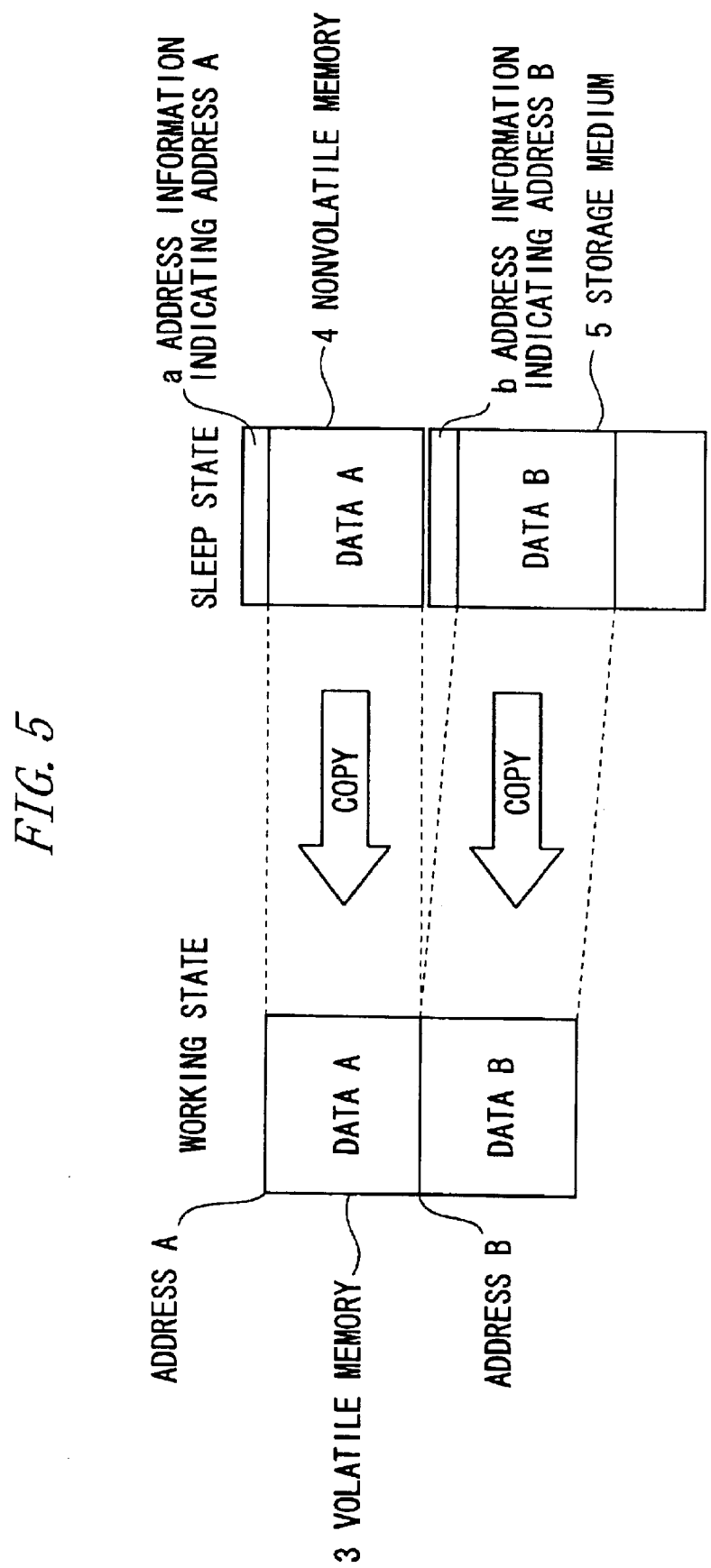

INFORMATION PROCESSING SYSTEM, INFORMATION PROCESSING METHOD AND READABLE-BY-COMPUTER RECORDING MEDIUM

This is a continuation of Application PCT/JP 99/06390, filed on Nov. 16, 1999.

BACKGROUND OF THE INVENTION

The present invention relates to an information processing system having a sleep function and a resume function. The present invention also relates to an information processing method when in a sleep process and a resume process, and to a readable-by-computer recording medium.

A concept of saving the energy has spread over the recent years and, in an information processing system typified by a computer system of a personal computer and so on, it is an important matter to actualize a low consumption of the electric power as well as to enhance a portability thereof. Under such circumstances, there is a spread of the information processing system having a sleep function (that may also be termed a suspend function) capable of temporarily restraining a consumption of the electric power when unused.

This sleep function is to temporarily switch off power sources of some or all of the devices of the system. If the power sources of all the devices are switched off, the information needed for executing an operating system (OS) and application software running in the information processing system, is saved in other storage units from a main memory when requested to switch off the power sources, and then the main power source (system power source) is brought into an off-state.

Further, a resume function is necessary for restoring the information processing system from the sleep state. This resume function enables the state just before requesting the power-off to be instantaneously reproduced by restoring the necessary information. Accordingly, the user does not need operations of booting and stopping the OS and the application software, and there is no decline of operability of the user.

In the sleep state for actualizing a low consumption of the electric power, power supplies to a multiplicity of devices configuring the information processing system are stopped, and hence information (including data) on a volatile main memory is saved in a nonvolatile sub-storage unit (flash memory) and a nonvolatile storage medium. In the resume process for restoring from the sleep state, however, a process of reading the information from storage mediums such as a hard disk (HD), a floppy disk (FD) and others takes much time, and the start-up is time-consuming.

One method of reducing the time for the resume process is proposed in Japanese Patent Application Laying-Open Publication Nos. 6-131082 and 8-305469. Further, one method of reducing both of a write time and the consumption of the electric power by writing to the flash memory as a substitute for the storage medium when in the suspend process, is proposed in Patent Application Laying-Open Publication No. 11-85332.

On the other hand, a measure of retaining the information by keeping the power supply to the volatile main memory is taken for speeding up the start-up when in the resume process. There, however, remain the devices (such as a central processing unit (CPU) and so on) requiring the power supply even in the sleep state, and therefore the consumption of the electric power cannot be made approximate to zero. Besides, if unable to supply the power due to a service interruption and so on, it is inevitable that contents in the volatile main memory are to be lost.

In view of the prior art described above, it is necessary to not only prevent the information from being lost or damaged when cutting off the power supply but also actualize a further decrease in the consumption of the electric power by utilizing the nonvolatile sub-storage unit and storage medium.

Moreover, the write to the nonvolatile storage medium such as the hard disk absolutely takes much time, however, the start-up time in the resume process is required to decrease by use of the nonvolatile sub-storage unit such as the flash memory exhibiting a higher operating speed than the nonvolatile storage medium. The nonvolatile sub-storage unit is, however, expensive, and hence there might be a case where it is difficult to ensure a capacity large enough to supplement a storage capacity of the volatile main memory.

SUMMARY OF THE INVENTION

Accordingly, it is a primary object of the present invention to provide an information processing system, an information processing method and a readable-by-computer recording medium which are capable of preventing information (data) from being lost or damaged due to a service interruption and others, and reducing both of a consumption of electric power and a start-up time when resuming.

It is another object of the present invention to attain the first object by restraining a cost for the information processing system from increasing.

To accomplish the above objects, an information processing system comprises a volatile storage unit stored with save target information to be saved when transiting to a sleep state in which a consumption of electric power can be temporarily restrained, a nonvolatile storage unit of saving the save target information when transiting the sleep state, a nonvolatile storage medium of storing the save target information remaining unstorable in the nonvolatile storage unit, and a control unit of storing the nonvolatile storage unit with the save target information and division-storing the nonvolatile storage medium with the save target information exceeding a storage capacity of the nonvolatile storage unit.

In this architecture, the control unit compares a quantity of information containing the save target information stored in the volatile storage unit with a storage capacity of the nonvolatile storage unit, and determines quantities of division-storage in the nonvolatile storage unit and in the nonvolatile storage medium.

Further, the control unit, when division-storing the nonvolatile storage unit and the nonvolatile storage medium with the save target information stored in the volatile storage unit, stores therein together with a piece of information indicating a storage location of the save target information on the volatile storage unit.

The control unit performs storing of information indicating that it has transited to the sleep state. The control unit starts a restoring process from the sleep state on the basis of the information indicating that it has transited to the sleep state.

The control unit stores the volatile storage unit with the save target information division-stored in the nonvolatile storage unit and in the nonvolatile storage medium on the basis of the information indicating the storage location that is stored in the nonvolatile storage unit and in the nonvolatile storage medium in the restoring process from the sleep state.

An information processing method and a readable-by-computer recording medium recorded with a program according to the present invention comprises storing a nonvolatile storage unit with save target information to be saved, which has been stored in a volatile storage unit, when transiting to a sleep state in which a consumption of electric power can be temporarily restrained, and division-storing a nonvolatile storage medium with the save target information exceeding a storage capacity of the nonvolatile storage unit.

The information processing method and a readable-by-computer recording medium recorded with a program according to the present invention involves comparing a quantity of information containing the save target information stored in the volatile storage unit with a storage capacity of the nonvolatile storage unit, and determining quantities of division-storage in the nonvolatile storage unit and in the nonvolatile storage medium.

The information processing method and a readable-by-computer recording medium recorded with a program according to the present invention, when division-storing the nonvolatile storage unit and the nonvolatile storage medium with the save target information stored in the volatile storage unit, involves storing therein together with a piece of information indicating a storage location of the save target information on the volatile storage unit.

The information processing method and a readable-by-computer recording medium recorded with a program according to the present invention involves performing storing of information indicating that it has transited to the sleep state.

The information processing method and a readable-by-computer recording medium recorded with a program according to the present invention involves starting a restoring process from the sleep state on the basis of the information indicating that it has transited to the sleep state.

The information processing method and a readable-by-computer recording medium recorded with a program according to the present invention involves storing the volatile storage unit with the save target information division-stored in the nonvolatile storage unit and in the nonvolatile storage medium on the basis of the information indicating the storage location that is stored in the nonvolatile storage unit and in the nonvolatile storage medium in the restoring process from the sleep state.

According to the present invention taking the architectures described above, it is possible to prevent the information (data) from being lost or damaged due to a service interruption and so on, and to reduce both of the consumption of the electric power and the start-up time when resuming, i.e., restoring from the sleep state.

Further, the storage capacity of the nonvolatile storage unit is checked, and, if smaller than a size of the save target information from the volatile storage unit, the nonvolatile storage medium compensates this deficiency, thereby making it possible to actualize the sleep state the information is not lost even if the power source is switched off also in the information processing system mounted with the nonvolatile storage unit of which the storage capacity is insufficient.

It is also feasible to actualize a speed-up of the start-up time when resuming corresponding to the storage capacity of the nonvolatile storage unit.

To change a point of view, the nonvolatile storage unit is faster in accessing speed than the nonvolatile storage medium. Namely, the flash memory is faster in the accessing speed than the hard disk. According to the present invention, the restoring time from the sleep state is reduced by preferentially using the faster in the accessing speed.

Moreover, the information is written to and read from the nonvolatile storage unit only by the electric access, and the nonvolatile storage unit involves mechanical operations for writing and reading the information. Namely, the flash memory needs only the electric access, however, the hard disk involves the mechanical operations of a head and so on. The operation of only the electric access is faster in processing speed, which leads to the decrease in the restoring time from the sleep state.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein:

FIG. 5 is an explanatory diagram showing how the data are copied when restoring from the sleep state;

DETAILED DESCRIPTION OF THE PREFERRED EMBODIMENTS

Next, embodiments of the present invention will hereinafter be described with reference to the drawings.

[Architecture of Personal Computer System]

Figure 1:
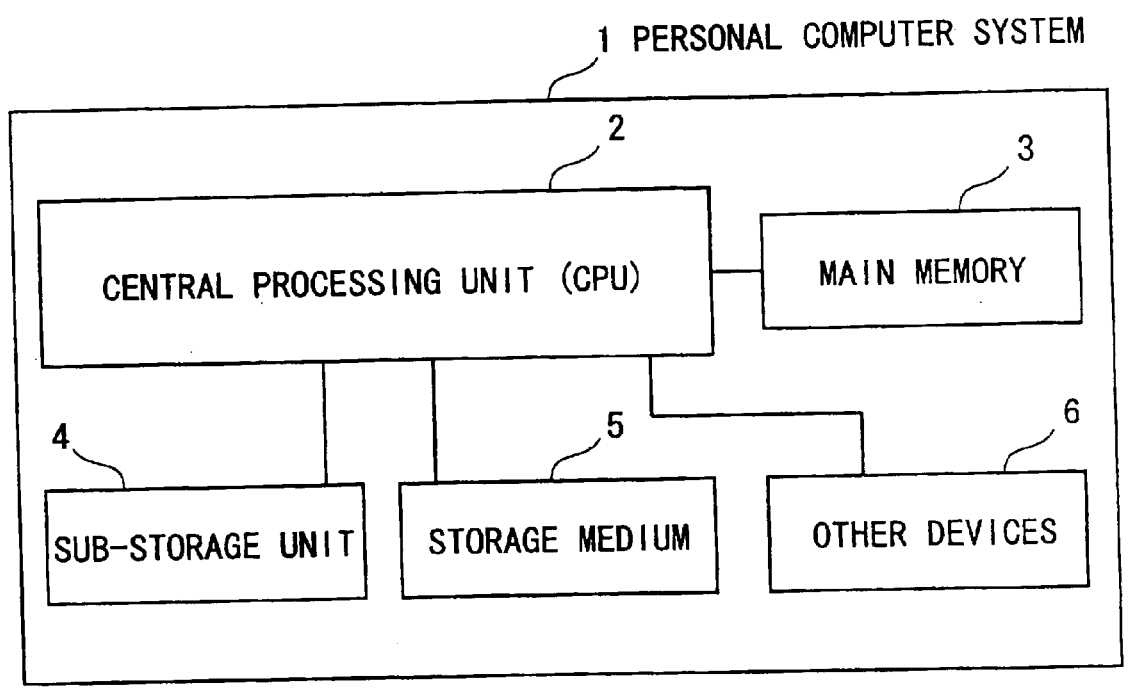
FIG. 1 is a block diagram showing an architecture of a personal computer system in one embodiment of the present invention.

FIG. 1 shows an architecture of a personal computer system as an information processing system in one embodiment of the present invention. Referring to FIG. 1, this system 1 is configured by a central processing unit (CPU) 2, a main memory 3 constructed of a volatile memory device, a sub-storage unit 4 constructed of a nonvolatile memory device, a nonvolatile storage medium 5 such as a hard disk (HD) or a floppy disk (FD), and other devices 6.

The main memory 3 can be constructed of a volatile memory device such as a DRAM (Dynamic Random Access Memory).

The nonvolatile sub-storage unit 4 can be constructed of a nonvolatile memory device such as a flash memory, i.e., a flash EEPROM (Electrically Erasable Programmable Read Only Memory). Further, the nonvolatile sub-storage unit 4 can be constructed of FRAM (Ferroelectric Random Access Memory) in addition to the flash memory.

Note that the main memory 3 and the nonvolatile sub-storage unit 4 might be termed respectively the volatile memory and the nonvolatile memory in the discussions on the following embodiments.

[Start-Up Time in Resume]

Figure 2:
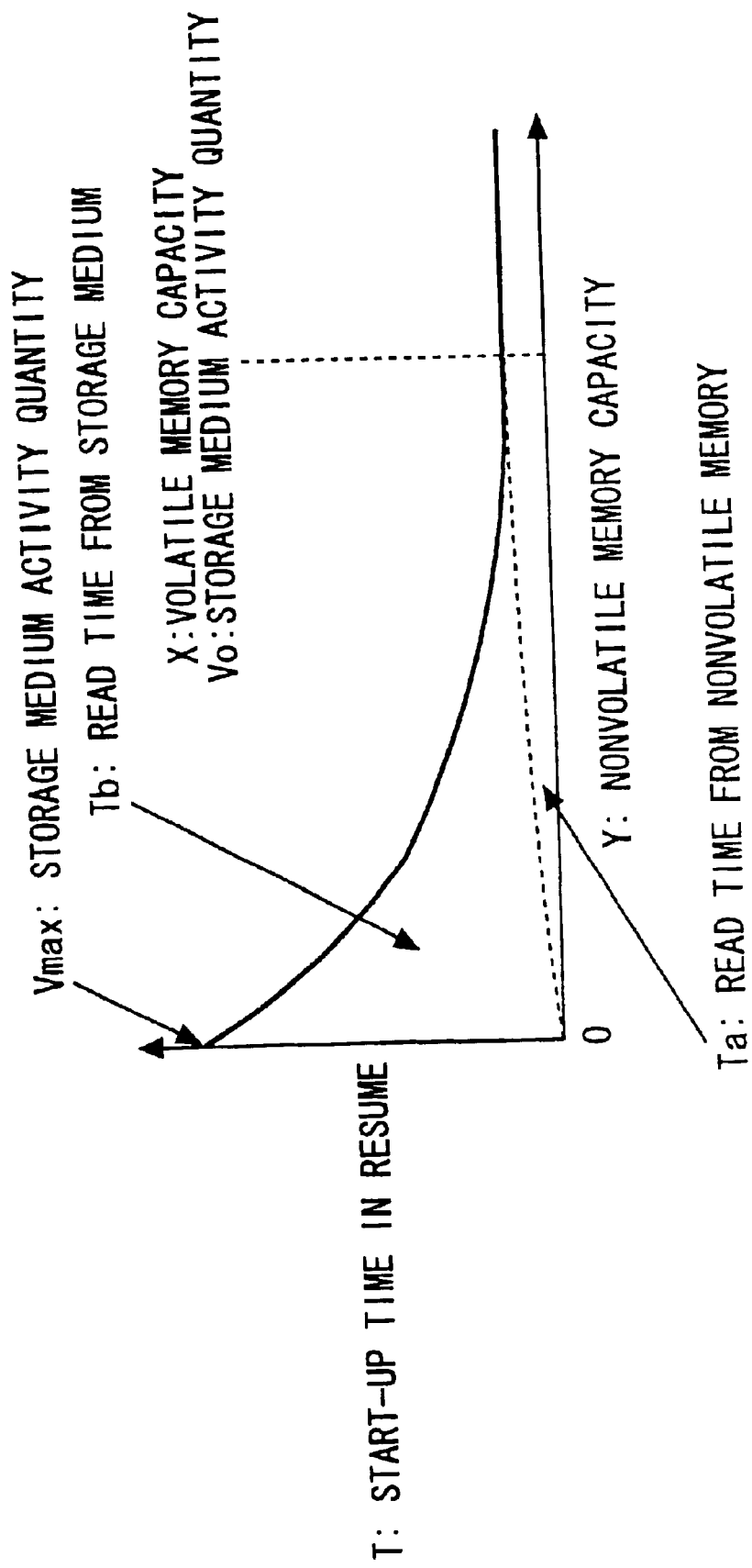
FIG. 2 is an explanatory characteristic diagram showing a start-up time when resuming.

Next, an in-resume start-up time of each of the nonvolatile memory 4 and the nonvolatile storage medium 5 will be explained with reference to FIG. 2. In this characteristic diagram, the axis of abscissa indicates a capacity (storage capacity) Y of the nonvolatile memory 4, and the axis of ordinates indicates a start-up time T when resuming.

As will be mentioned in detail, the information (data) stored in the volatile memory 3 is saved (copied) in the nonvolatile memory 4 and the storage medium 5 in the sleep process. When resuming, the start-up is carried out by a process of reading the information saved in the nonvolatile memory 4 and the storage medium 5 and writing (copying) the information to the volatile memory 3.

The following can be understood from this characteristic diagram. Namely, with respect to a capacity (a data size that should be saved) X of the volatile memory 3, when all the information can be saved in the nonvolatile memory 4, the in-resume start-up time T is a slight read time Ta from the nonvolatile memory 4.

If the information is saved not only in the nonvolatile memory 4 but also in the storage medium 5, the in-resume start-up time T becomes a value obtained by adding a read time Tb from the storage medium 5 to the read time Ta from the nonvolatile memory 4 in proportion to an activity quantity V (Vmax is a maximum activity quantity, and V0 indicates an activity quantity "zero" in this Figure) of the storage medium 5. The nonvolatile memory 4 is faster in operation speed than the storage medium 5, and therefore the in-resume start-up time T can be made shorter as the information to be saved in the storage medium 5 becomes smaller.

Accordingly, in the personal computer 1 shown in FIG. 1, the storage capacity Y of the nonvolatile memory 4 is examined, and, if smaller than the storage capacity of the volatile memory 3, precisely than the information quantity X to be saved, a deficiency thereof is compensated by non-volatile storage medium 5, thereby making it possible to actualize the decrease in the start-up time T corresponding to the storage capacity Y of the nonvolatile memory 4.

[Outline of Data Copy in Transition to and Resume from Sleep State]

Figure 3:
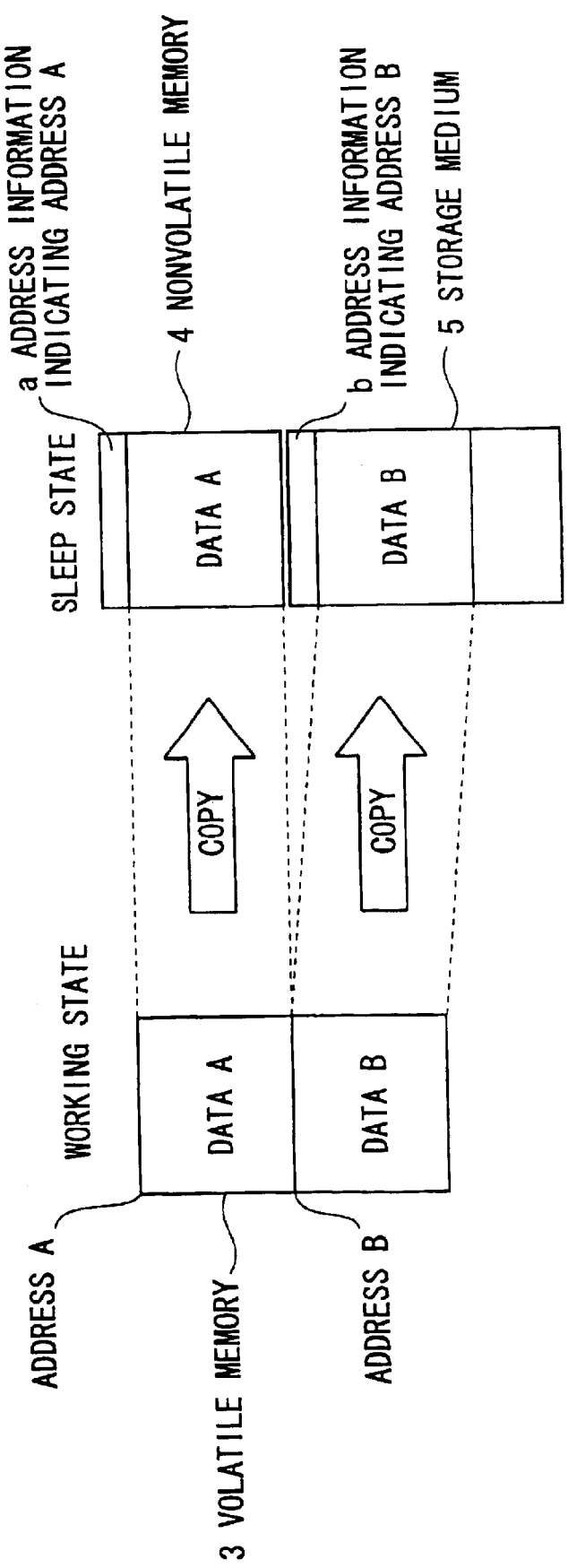
FIG. 3 is an explanatory diagram showing how data are copied when transiting to a sleep state.

Referring to FIG. 3, in the personal computer system 1 shown in FIG. 1, when transiting to the sleep state for the purpose of reducing a consumption of the electric power, to start with, the capacity (storage capacity) of the volatile memory 3 is checked. At this time, all the areas of the nonvolatile memory 4 are set usable. An [equal capacity a] of the data (data A) to that of the nonvolatile memory 4 is established. This [capacity a] is a capacity needed for recording address information indicating a start-of-storage address A of the data A on the volatile memory 3.

The data A and the address A are copied to the nonvolatile memory 4. Data B remaining uncopied to the nonvolatile memory 4 is copied to the storage medium 5. On this occasion, address information indicating a start-of-storage address B of the data B on the volatile memory 3 is recorded on a [capacity b] of the storage medium 5. After finishing these operations, power sources of all the devices including the volatile memory 3 within the personal computer system 1 are switched off, thus completing the shift to the sleep state.

Figure 4:
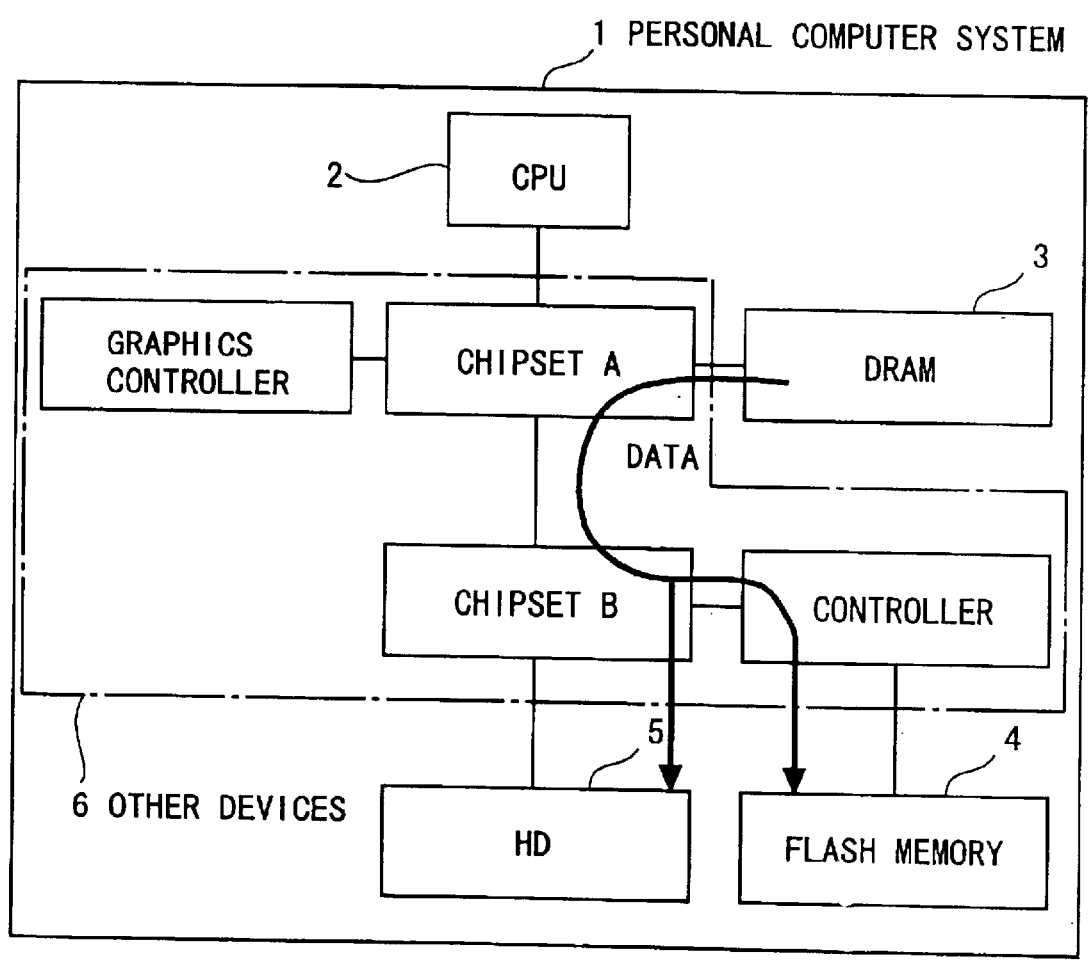
FIG. 4 is a block diagram showing a state of copying the data when transiting to the sleep state on the architecture of the personal computer system.
Figure 6A:
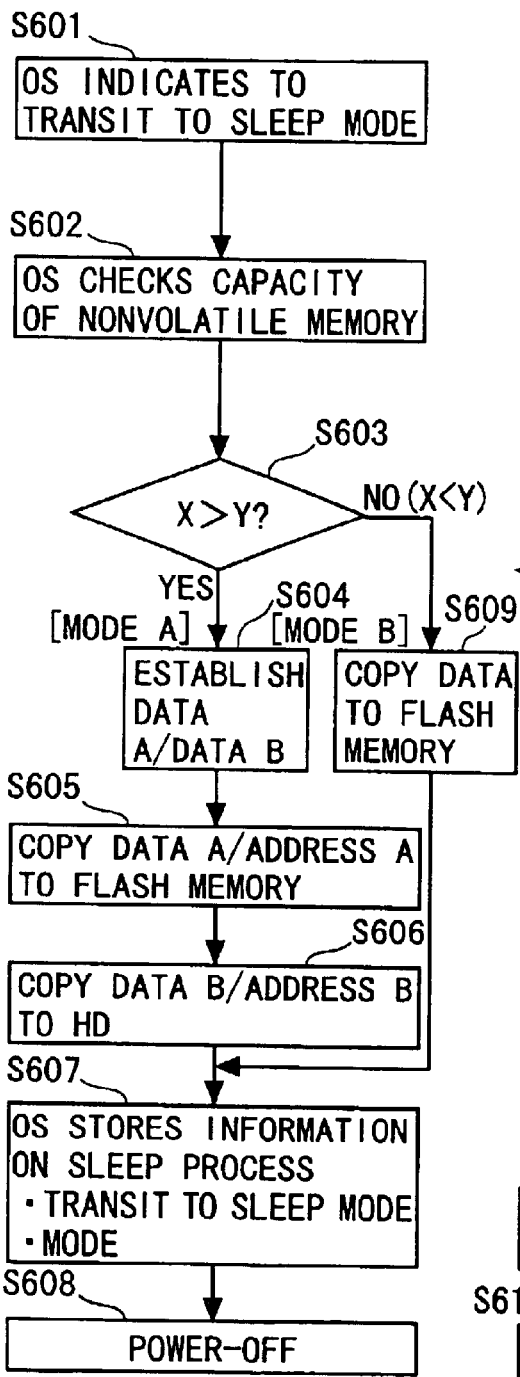
FIGS. 6A and 6B are explanatory flowcharts showing a first operational example when transiting to and resuming from the sleep state.
Figure 6B:
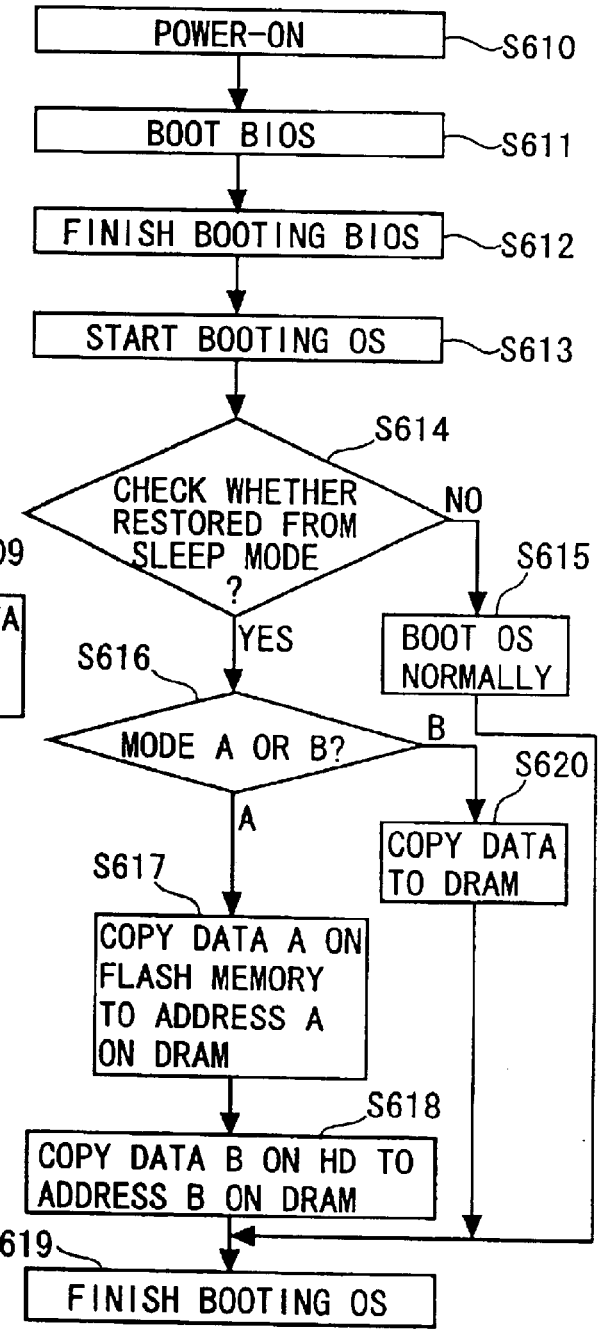
Figure 7A:
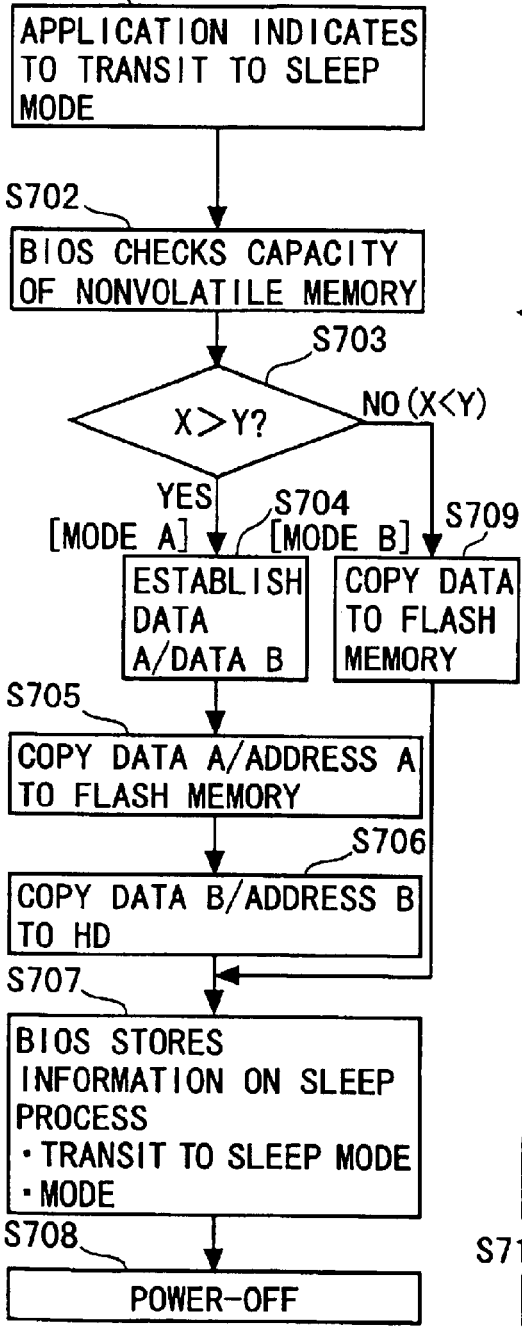
FIGS. 7A and 7B are explanatory flowcharts showing a first operational example when transiting to and resuming from the sleep state.
Figure 7B:
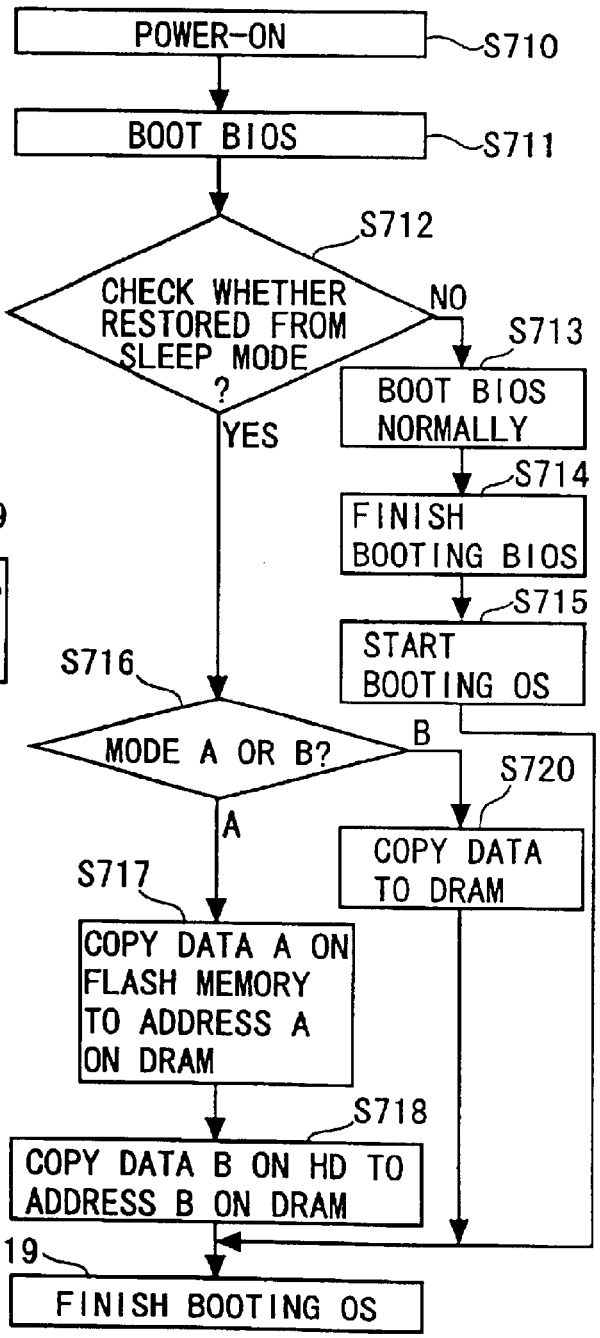

FIG. 4 shows a state of the data copy when transiting to the sleep state described above in the architecture of the personal computer system 1. Note that the volatile memory 3, the nonvolatile memory 4 and the storage medium 5 are configured by using the DRAM, the flash memory and the hard disk (HD). Other devices 6 include a control unit (Graphics Controller) of the display device, interface modules (Chipset A, Chipset B) between the component devices, a control unit (controller) of the flash memory, and others.

Referring to FIG. 5, when restoring, i.e., resuming from the sleep state, all the devices of the personal computer system 1 are supplied with the electric power. Thereafter, the data A on the nonvolatile memory 4 is copied to the address A on the volatile memory 3 on the basis of the address information in the storage area [a]. Further, the data B on the storage medium 5 is copied to the address B on the volatile memory 3 on the basis of the address information in the storage area [b]. In this case, the time spent for resuming decreases as the size of the data B is reduced.

[Operational Example 1 of Transition to and Resume from Sleep State]

Next, a first operational example of the personal computer system 1 in one embodiment of the present invention illustrated in FIG. 1, will be explained. Herein, the discussion will be focused on a case where the operating system (OS) controls the sleep process and the resume process, and the volatile memory 3, the nonvolatile memory 4 and the nonvolatile storage medium 5 are constructed of the DRAM, the flash memory and the had disk (HD), respectively.

Referring to FIGS. 1 through 6 in combination, if the user or the OS indicates a transition to the sleep state (sleep mode) (step S601), the OS calculates a total capacity (including the data size to be saved and the address data sizes a, b in FIGS. 3 and 4) X of the information in the DRAM 3, and judges whether the capacity (storage capacity) Y of the flash memory 4 is sufficient (S602). Strictly, the OS calculates the total capacity X with the data of the respective devices being contained to be saved in the data size but is to ignore it because of being small in quantity.

As a result, if the capacity of the flash memory 4 is insufficient (X>Y, mode A), the data to be saved are divided based on the capacity of the flash memory 4 (S603, S604). The data to be copied to the flash memory 4 are set as [data A], and the data to be copied to the HD 5 are set as [data B]. Further, a head address of the data A on the DRAM 3 is set as an [address A], and a head address of the data B is set as an [address B].

Next, the data A and the address A are copied to the flash memory 4 from the DRAM 3 (S605). Further, the data B and the address B are copied to the HD 4 from the DRAM 3 (S606). When the copying of all the data is finished, the OS stores a system area of the OS with pieces of information on the sleep process such as [transited to the sleep mode] and [transited in the mode A] (S607). After this process, the user switches off the power sources of all the devices, and finishes the process of transiting to the sleep mode (S608).

As a result of judging the capacity in step S603, if the capacity of the flash memory 4 is sufficient (X<Y, mode B), the OS copies all the to-be-saved data in the DRAM 3 to the flash memory 4 (S609). Thereafter, the OS stores the system area of the OS with pieces of information on the sleep process such as [transited to the sleep mode] and [transited in the mode B] (S607). After this process, the user switches off the power sources of all the devices, and finishes the process of transiting to the sleep mode (S608).

In the sleep state, it does not happen that the saved data are lost even if a plug is pulled out of or inserted into a socket of the power source or a service interruption occurs.

On the other hand, when restoring from the sleep mode, i.e., in the resume process, the user at first switches on the power source (S610), and, after booting BIOS (basic Input/Output System) and executing an end-of-boot process (S611, S612), the OS is booted (S613).

The OS, to begin with, confirms whether restored from the sleep mode by referring to the information on the sleep process that has been stored in the system area (S614). If not restored from the sleep mode, the OS is normally booted (S615).

If restored from the sleep mode, the OS reads which mode, the mode A or B, from the information on the sleep process (S616). In the case of the mode B, the data saved in the flash memory 4 are copied to the DRAM 3 (S620), and, after the copying has been finished, the system operation is started. Namely, the OS boot is ended (the end of the start-up) (S619).

Further, as a result of the process in step S616, if the OS judges that the mode is the mode A, the data A is copied to an area after the address A on the DRAM 3 and the data B is copied to an area after the address B respectively from the flash memory 4 and the HD 5 (S617, S618). After an end of the copying, the system operation starts, and the OS boot is ended (the end of the start-up) (S619).

Note that the BIOS is defined as a control program in the OS, which depends on the hardware. Generally, the OS for the personal computer system is configured in a way that categorizes modules controlling the hardware and modules not controlling it as different module suites, separately. This hardware control module suite is called the BIOS. A cover range of the BIOS targets at peripheral devices including a display connected to the personal computer system and the hard disk.

[Operational Example 2 of Transition to and Resume from Sleep State]

Next, a second operational example of the personal computer system 1 in one embodiment of the present invention illustrated in FIG. 1, will be explained. Herein, the discussion will be focused on a case where the BIOS controls the sleep process and the resume process, and the volatile memory 3, the nonvolatile memory 4 and the nonvolatile storage medium 5 are constructed of the DRAM, the flash memory and the had disk (HD), respectively.

Referring to FIGS. 1 through 7 in combination, if the user or the OS indicates the transition to the sleep state (sleep mode), the BIOS is informed of the shift to the sleep mode through BIOS-oriented application software (step S701). The BIOS calculates a total capacity (including the data size to be saved and the address data sizes a, b in FIGS. 3 and 4) X of the information of the respective devices and the information in the DRAM 3, and judges whether the capacity (storage capacity) Y of the flash memory 4 is sufficient (S702). Strictly, the BIOS calculates the total capacity X with the data of the respective devices being contained in the data size to be saved but is to ignore it because of being small in quantity.

As a result, if the capacity of the flash memory 4 is insufficient (X>Y, mode A), the data to be saved are divided based on the capacity of the flash memory 4 (S703, S704). The data to be copied to the flash memory 4 are set as [data A], and the data to be copied to the HD 5 are set as [data B]. Further, the head address of the data A on the DRAM 3 is set as the [address A], and the head address of the data B is set as the [address B].

Next, the data A and the address A are copied to the flash memory 4 from the DRAM 3 (S705). Further, the data B and the address B are copied to the HD 4 from the DRAM 3 (S706). When the copying of all the data is finished, the BIOS stores a BIOS area with pieces of information on the sleep process such as [transited to the sleep mode] and [transited in the mode A] (S707). After this process, the user switches off the power sources of all the devices, and finishes the process of transiting to the sleep mode (S708).

As a result of judging the capacity in step S703, if the capacity of the flash memory 4 is sufficient (X<Y, mode B), the BIOS stores the BIOS area with pieces of information on the sleep process such as [transited to the sleepmode] and [transited in the mode B] (S707). After this process, the user switches off the power sources of all the devices, and finishes the process of transiting to the sleep mode (S708).

In the sleep state, it does not happen that the saved data are lost even if the plug is pulled out of or inserted into the socket of the power source or the service interruption occurs.

On the other hand, when restoring from the sleep mode, i.e., in the resume process, the user at first switches on the power source (S710), and the BIOS is booted (S711). Then, the BIOS, to begin with, confirms whether restored from the sleep mode by referring to the information on the sleep process that has, been stored in the BIOS area (S712). If not restored from the sleep mode, after normally booting the BIOS and executing end-of-boot process (S713, S714), the OS is booted (S715), and the OS boot is ended (the end of the start-up) (S719).

If restored from the sleep mode, the BIOS reads which mode, the mode A or B, from the information on the sleep process (S716). In the case of the mode B, the data saved in the flash memory 4 are copied to the DRAM 3 (S720), and, after the copying has been finished, the system operation is started. Namely, the OS boot is ended (the end of the start-up) (S719).

Further, as a result of the process in step S716, if the BIOS judges that the mode is the mode A, the data A is copied to an area after the address A on the DRAM 3 and the data B is copied to an area after the address B respectively from the flash memory 4 and the HD 5 (S717, S718). After an end of the copying, the system operation starts, and the OS boot is ended (the end of the start-up) (S719).

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. An information processing system comprising:
   a volatile storage unit storing save target information to be saved when transiting to a sleep state in which a consumption of electric power is temporarily restrained;
   a nonvolatile storage unit saving the save target information when transiting to the sleep state;
   a nonvolatile storage medium storing the save target information remaining unstorable in said nonvolatile storage unit; and
   a control unit storing said nonvolatile storage unit with the save target information and division-storing said nonvolatile storage medium with the save target information exceeding a storage capacity of said nonvolatile storage unit,
   wherein said control unit compares a quantity of information containing the save target information stored in said volatile storage unit with a storage capacity of said nonvolatile storage unit, and determines quantities of division-storage in said nonvolatile storage unit and in said nonvolatile storage medium, and wherein said control unit, when division-storing said nonvolatile storage unit and said nonvolatile storage medium with the save target information stored in said volatile storage unit, stores therein together with a piece of information indicating a storage location of the save target information on said volatile storage unit.

2. An information processing system according to claim 1, wherein said control unit performs storing of information indicating that it has transited to the sleep state.

3. An information processing system according to claim 2, wherein said control unit starts a restoring process from the sleep state on the basis of the information indicating that it has transited to the sleep state.

4. An information processing system according to claim 3, wherein said control unit stores said volatile storage unit with the save target information division-stored in said nonvolatile storage unit and in said nonvolatile storage medium on the basis of the information indicating the storage location that is stored in said nonvolatile storage unit and in said nonvolatile storage medium in the restoring process from the sleep state.

5. A readable-by-computer recording medium recorded with a program executed by a computer, comprising:

storing a nonvolatile storage unit with save target information to be saved, which has been stored in a volatile storage unit, when transiting to a sleep state in which a consumption of electric power can be temporarily restrained; and division-storing a nonvolatile storage medium with the save target information exceeding a storage capacity of said nonvolatile storage unit, comparing a quantity of information containing the save target information stored in said volatile storage unit with a storage capacity of said nonvolatile storage unit; and determining quantities of division-storage in said nonvolatile storage unit and in said nonvolatile storage medium; and storing, when division-storing said nonvolatile storage unit and said nonvolatile storage medium with the save target information stored in said volatile storage unit, therein together with a piece of information indicating a storage location of the save target information on said volatile storage unit.

6. A readable-by-computer recording medium recorded with a program executed by a computer according to claim 5, further comprising performing storing of information indicating that it has transited to the sleep state.

7. A readable-by-computer recording medium recorded with a program executed by a computer according to claim 6, further comprising starting a restoring process from the sleep state on the basis of the information indicating that it has transited to the sleep state.

8. A readable-by-computer recording medium recorded with a program executed by a computer according to claim 7, further comprising storing said volatile storage unit with the save target information division-stored in said nonvolatile storage unit and in said nonvolatile storage medium, on the basis of the information indicating the storage location that is stored in said nonvolatile storage unit and in sad nonvolatile storage medium in the restoring process from the sleep state.

9. An information processing method comprising:

storing a nonvolatile storage unit with save target information to be save, which has been stored in a volatile storage unit, when transiting to a sleep state in which a consumption of electric power can be temporarily restrained; and division-storing a nonvolatile storage medium with the save target information exceeding a storage capacity of said nonvolatile storage unit;

comparing a quantity of information containing the save target information stored in said volatile storage unit with a storage capacity of said nonvolatile storage unit; and determining quantities of division-storage in said nonvolatile storage unit and in said nonvolatile storage medium; and storing, when division-storing said nonvolatile storage unit and said nonvolatile storage medium with the save target information stored in said volatile storage unit, therein together with a piece of information indicating a storage location of the save target information on said volatile storage unit.

10. An information processing method according to claim 9, further comprising performing storing of information indicating that it has transited to the sleep state.

11. A information processing method according to claim 10, further comprising starting a restoring process from the sleep state on the basis of the information indicating that it has transited to the sleep state.

12. An information processing method according to claim 11, further comprising storing said volatile storage unit with the save target information division-stored in said nonvolatile storage unit and in said nonvolatile storage medium, on the bass of the information indicating the storage location that is stored in said nonvolatile storage unit and in said nonvolatile storage medium in the restoring process from the sleep state.

* * * * *

UNITED STATES PATENT AND TRADEMARK OFFICE
CERTIFICATE OF CORRECTION

PATENT NO.    : 6,851,012 B2
DATED         : February 1, 2005
INVENTOR(S)   : Masaki Yamashima It is certified that error appears in the above-identified patent and that said Letters Patent is hereby corrected as shown below:

Column 10,
Line 9, change "sad" to -- said --;
Line 37, change "A" to -- An --; and
Line 45, change "bass" to -- basis --.

Signed and Sealed this

Twenty-ninth Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,851,012 B2
DATED : February 1, 2005
INVENTOR(S) : Masaki Yamashima It is certified that error appears in the above-identified patent and that said Letters Patent is hereby corrected as shown below:

Column 10,
Line 14, change "save" to -- saved --.

Signed and Sealed this

Twenty-first Day of March, 2006

JON W. DUDAS
*Director of the United States Patent and Trademark Office*